April 3, 1951  D. T. STREET  2,547,348
CORNEAL SIGHTING GAUGE FOR TRIAL FRAMES
Filed April 13, 1949
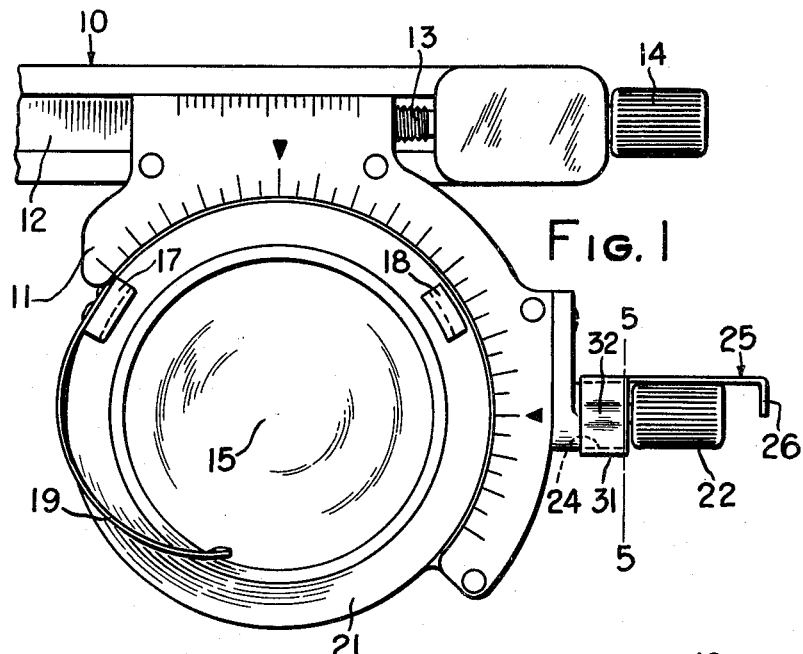
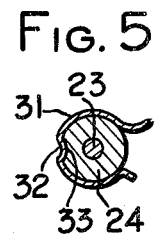
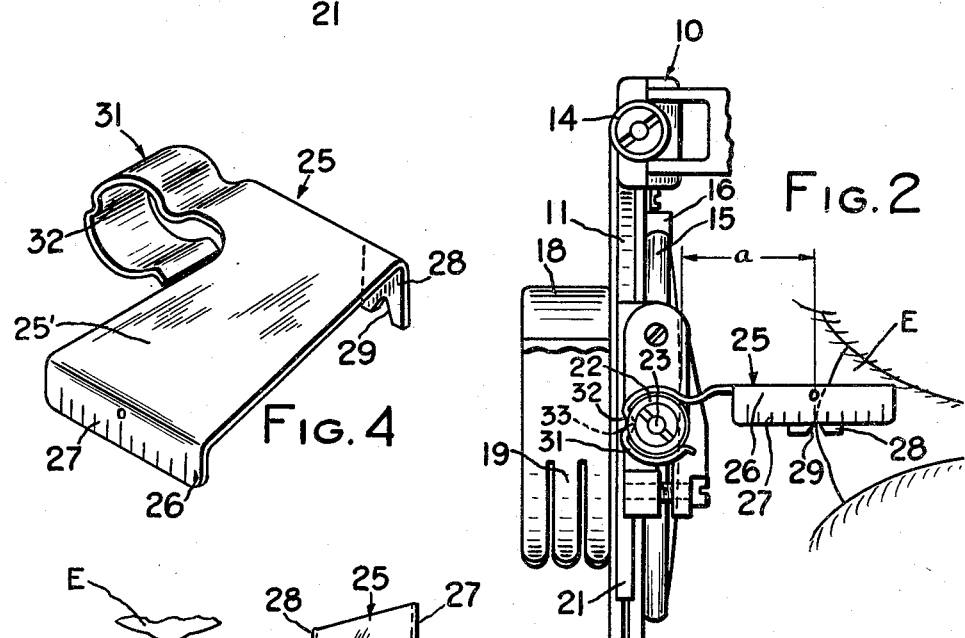
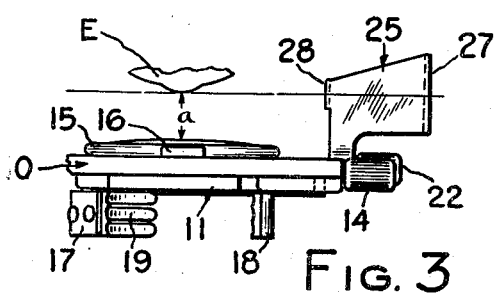
INVENTOR.
BY DONALD T. STREET

Patented Apr. 3, 1951

2,547,348

UNITED STATES PATENT OFFICE 2,547,348

CORNEAL SIGHTING GAUGE FOR TRIAL FRAMES

Donald T. Street, Brighton, N. Y., assignor to Bausch & Lomb Optical Company, Rochester, N. Y., a corporation of New York Application April 13, 1949, Serial No. 87,235

2 Claims. (Cl. 88—20)

The present invention relates to improvements in ophthalmic trial frames for holding test lenses before the eyes of a patient and more particularly it has reference to a sighting gauge whereby a test lens may either be located at a fixed distance from the cornea of the eye or the distance between lens and cornea may be measured.

An object of this invention is to provide an improved corneal sighting gauge for ophthalmic trial frames which is simple and inexpensive to manufacture and is efficient in use.

It is another object to provide such a gauge which is easily demountable from the trial frame without the use of tools and is held reliably in correct operating position on the frame.

Other objects and advantages reside in the novel details of construction and combination of parts as described in the following specification and shown in the accompanying drawing in which:

Fig. 1 is a front view of a part of a trial frame showing my corneal sighting gauge attached thereto, Fig. 2 is a side view of the structure shown in Fig. 1, Fig. 3 is a fragmentary top view of a trial frame showing the corneal sighting gauge aligned with the cornea of an eye, Fig. 4 is a perspective view of the corneal sighting gauge, and Fig. 5 is a sectional view taken on the line 5—5 of Fig. 1.

A portion of a trial frame, shown in Fig. 1, comprises a body 10 to which a depending lens holder 11 is slidably attached in any preferred manner, such as a channel 12, and adapted to be moved along the channel by a screw 13 to which is attached a knob 14. On the rear side of the trial frame, a test lens 15 is demountably held by spring means, not shown, against a placement lug 16 shown in Fig. 2. Other test lenses may be held in alignment on the front side of the trial frame and against the placement lugs 17 and 18 by a triple spring 19. The lugs 17 and 18 are fixed on a ring 21 rotatably mounted on the lens holder 11 and the ring is rotated by means of suitable mechanism, not shown. Said mechanism is actuated by a knob 22 secured to the end of a stem 23 which is journaled within a hole in a fixed post 24 extending laterally from the lens holder 11. This construction is typical of the usual trial frames in the art and it forms no part of the present invention.

According to this invention, a corneal sighting gauge 25, best shown in Fig. 4, is provided for gauging or determining the distance between the rear surface of the test lens 15 and the cornea of the eye which is being examined. The corneal sighting gauge is preferably formed of a single piece of flat spring steel and comprises the base portion 25' having at one end a downturned flange 26 which is provided with a suitable scale 27. The other end of the base portion 25' has a downturned flange 28 which is provided with a sighting notch 29 which is aligned with the zero mark of scale 27. Extending laterally from the base portion 25' is the spring clip 31 which is adapted to partially encircle and frictionally grip the post 24 of the trial frame so as to detachably hold the sighting gauge thereon. In order to locate and hold the sighting gauge in proper position and prevent its rotation about the post 24, the clip 31 is formed with a depressed portion or rib 32 which is adapted to snap into a groove 33 formed in the post 24.

When using the corneal sighting gauge 25 on the trial frame, it is only necessary to slip the spring clip 31 over the post 24 so that the rib 32 engages within the groove 33. Then the supporting members for the trial frame, such as the nosepiece and the temples not shown, are adjusted so as to move the trial frame until the zero mark on scale 27 and the sighting notch 29 are aligned with the apex of the cornea of the eye E. The lens 15 is thereby adjusted so that the vertex of the test lens is spaced a fixed distance $a$ from the apex of the cornea of the eye under examination. Or, the refractionist may use the scale 27 for measuring the distance beween the lens and the cornea. Errors due to parallax are avoided because of the construction of the sighting device.

It will be seen that there is here provided a light weight demountable corneal sighting gauge for trial frames which is self-aligned, inexpensive to manufacture and simple to use while being reliable and rugged in structure in accordance with the objects of this invention.

Although but a single form of this invention has been shown and described in detail, it will be understood that other forms are possible and changes may be made in the details of construction of this device without departing from the spirit of the invention as defined in the appended claims.

I claim:

1. In a trial frame having a holder for a test lens and a post extending laterally from the holder at the temporal portion thereof, the combination of a corneal sighting device comprising a base portion, flanges projecting from the opposite ends of the base portion, one of the flanges carrying scale means, the other flange having sighting means, and a yieldable, reversely-formed attaching clip projecting laterally from the base portion and adapted to frictionally grip the post for detachably holding the gauge on the trial frame.

2. In a trial frame having a holder for a test lens and a post extending laterally from the holder at the temporal portion thereof, the combination of a corneal sighting device comprising a base portion, flanges projecting from the opposite ends of the base portion, one of the flanges carrying scale means, the other flange having sighting means, a resilient, hook-shaped attaching clip projecting laterally from the base portion and adapted to fit over the post, and cooperating means on the post and clip for locating the gauge relative to the trial frame whereby the gauge is detachably held thereon.

DONALD T. STREET.

REFERENCES CITED

The following references are of record in the file of this patent:

UNITED STATES PATENTS

| Number | Name | Date |
|---|---|---|
| 1,429,854 | Elmore | Sept. 19, 1922 |
| 1,481,926 | Poser | Jan. 29, 1924 |
| 1,710,245 | Shryver | Apr. 23, 1929 |
| 2,056,469 | King | Oct. 6, 1936 |
| 2,068,103 | Harris | Jan. 19, 1937 |
| 2,295,791 | Hornback | Sept. 15, 1942 |
| 2,432,676 | Peck et al. | Dec. 16, 1947 |